(12) United States Patent
Booc

(10) Patent No.: US 10,798,925 B1
(45) Date of Patent: Oct. 13, 2020

(54) MAGNETIC BAIT-RELEASE DEVICE

(71) Applicant: Roger Llamas Booc, Tiffin, OH (US)

(72) Inventor: Roger Llamas Booc, Tiffin, OH (US)

( * ) Notice: Subject to any disclaimer, the term of this patent is extended or adjusted under 35 U.S.C. 154(b) by 0 days.

(21) Appl. No.: 16/905,678

(22) Filed: Jun. 18, 2020

Related U.S. Application Data

(60) Provisional application No. 62/911,135, filed on Oct. 4, 2019, provisional application No. 62/956,750, filed on Jan. 3, 2020.

(51) Int. Cl.
A01K 83/06 (2006.01)
A01K 97/05 (2006.01)

(52) U.S. Cl.
CPC .............. A01K 83/06 (2013.01); A01K 97/05 (2013.01)

(58) Field of Classification Search
CPC ........ A01K 97/02; A01K 83/06; A01K 97/05; A01K 99/00
USPC .......................................................... 43/44.2
See application file for complete search history.

(56) References Cited

U.S. PATENT DOCUMENTS

| | | | | |
|---|---|---|---|---|
| 3,728,812 A | * | 4/1973 | Woolworth | A01K 97/05 43/55 |
| 4,070,786 A | * | 1/1978 | Dunham | A01K 97/05 43/55 |
| 4,554,757 A | * | 11/1985 | Sakuta, Jr. | A01K 97/05 43/55 |
| 5,394,639 A | * | 3/1995 | Tentler | A01K 97/05 43/55 |
| 6,584,727 B1 | * | 7/2003 | De Shazer | A01K 97/05 43/55 |
| 2007/0056206 A1 | * | 3/2007 | Bowerman | A01K 97/02 43/44.99 |
| 2011/0041381 A1 | * | 2/2011 | Houghton | A01K 97/02 43/44.99 |
| 2012/0317867 A1 | * | 12/2012 | Houghton | A01K 97/02 43/44.99 |
| 2013/0014424 A1 | * | 1/2013 | Weishner | A01K 97/125 43/17.5 |
| 2016/0106079 A1 | * | 4/2016 | Best | A01K 97/05 43/102 |
| 2018/0242566 A1 | * | 8/2018 | Hutchinson | A01K 69/08 |

FOREIGN PATENT DOCUMENTS

WO   WO-2019097558 A1 * 5/2019 ............. A01K 97/02

* cited by examiner

Primary Examiner — Christopher P Ellis

(57) ABSTRACT

A magnetic bait-release device is an apparatus that houses live bait and remotely releases the live bait with a connected fishing line of a fishing pole. The apparatus includes a tubular housing, a fixed lid, a release lid, and a latch mechanism. The tubular housing contains the live bait with the fixed lid and the release lid. The release lid releases the live bait upon the engagement of the latch mechanism with the connected fishing line of the fishing pole. The latch mechanism includes a trigger bar, a slot, a handle, an eyelet, a compression spring, a fixed magnet, and a free magnet. The fixed magnet is positioned within the tubular housing with the trigger bar. The free magnet is mounted within the release lid. The compression spring forcibly retracted the trigger bar with a pull of the connected fishing line which is connected with the eyelet.

18 Claims, 6 Drawing Sheets

MAGNETIC BAIT-RELEASE DEVICE

The current application claims a priority to the U.S. provisional patent application Ser. No. 62/911,135 filed on Oct. 4, 2019 and a priority to the U.S. provisional patent application Ser. No. 62/956,750 filed on Jan. 3, 2020.

FIELD OF THE INVENTION

The present invention generally relates to fishing sports. More specifically, the present invention is a magnetic bait-release device.

BACKGROUND OF THE INVENTION

Fishing typically requires specific equipment in order to attract and catch specific fish. Specific sinkers are required for each type of live bait and each type of fish. The more equipment needed, the more money spent, and the more space required to store the equipment in an organized fashion.

It is therefore an objective of the present invention to deliver a variety of live bait at varying depths. The present invention further serves as a universal delivery system for live bait as the present invention is able to securely deliver live bait in bulk and in a variety of mixes. The present invention attracts fish with live bait while keeping the live bait contained and alive until released. The present invention eliminates the need for any sinker and only releases live bait at the control of the user. While underwater, live baits with no sinker only encounter line drag resistance and can swim both faster and farther, therefore more likely attracting nearby fish. The present invention may be engaged with a variety of fishing rods and is reusable.

DETAIL DESCRIPTIONS OF THE INVENTION

All illustrations of the drawings are for the purpose of describing selected versions of the present invention and are not intended to limit the scope of the present invention.

Figure 1:
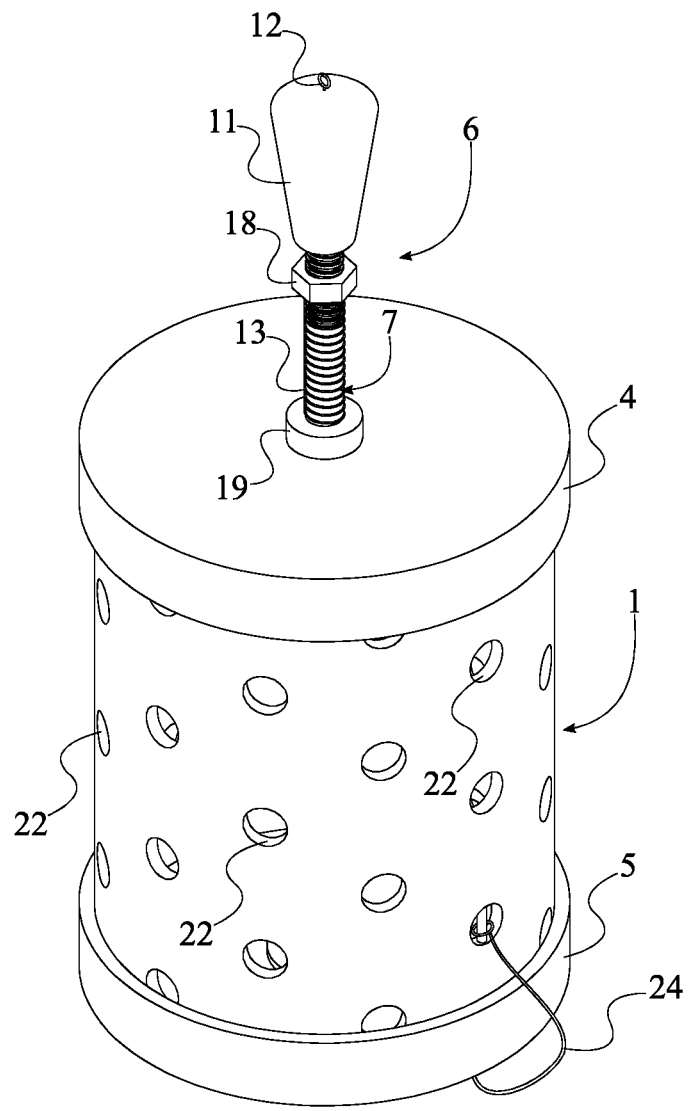
FIG. 1 is a perspective view of the present invention in a closed configuration.
Figure 2:
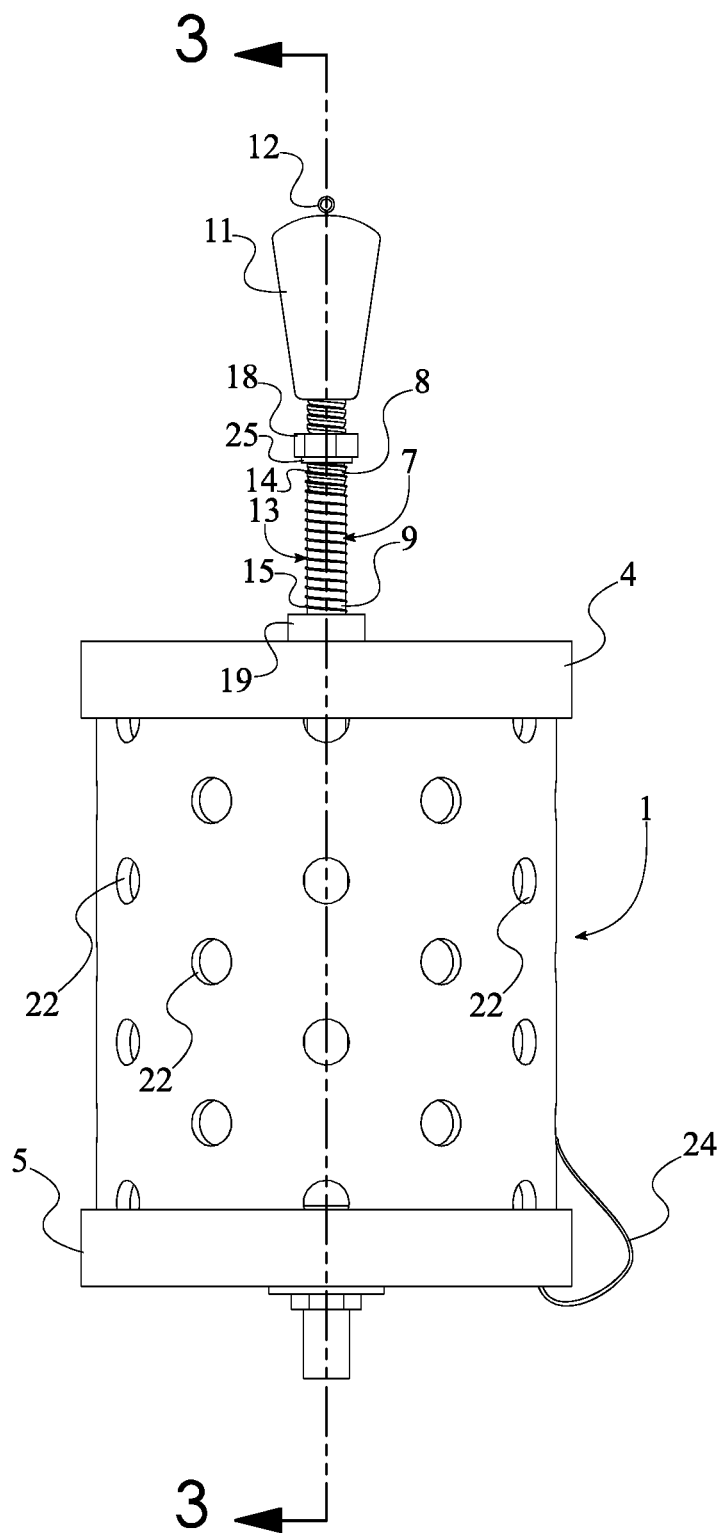
FIG. 2 is a front side view of the present invention thereof.

The present invention is a magnetic bait-release device that securely houses live bait in a body of water until the time of release at a desired location. A user manually engages the present invention in order to release the live bait housed within the present invention. The present invention may contain a variety of types of live bait and varying amounts of live bait. In order for the present invention to securely contain live bait in turbulent bodies of water until a desired release, a preferred embodiment of the present invention comprises a tubular housing 1, a fixed lid 4, a release lid 5, and a latch mechanism 6, seen in FIG. 1 and FIG. 4. The tubular housing 1 surrounds live bait. More specifically, the tubular housing 1 comprises a first rim 2 and a second rim 3. The fixed lid 4 and the release lid 5, together, contains the live bait within the tubular housing 1 across the first rim 2 and the second rim 3, respectively. The fixed lid 4 further mounts and connects the latch mechanism 6 with the tubular housing 1. The release lid 5 opens the tubular housing 1 in order to release the live bait within the tubular housing 1. The latch mechanism 6 connects and disconnects the release lid 5 around the second rim 3 of the tubular housing 1. The latch mechanism 6 comprises a trigger bar 7, a slot 10, a handle 11, an eyelet 12, a compression spring 13, a fixed magnet 16, and a free magnet 17. The trigger bar 7 positions and orients the fixed magnet 16 within the tubular housing 1. The slot 10 allows the trigger bar 7 to slide through the fixed lid 4 as well as secures the orientation of the trigger bar 7 within the tubular housing 1. The handle 11 provides a grip for the user to directly maneuver the trigger bar 7. The eyelet 12 provides a mount for a fishing line of a fishing pole to connect with the present invention. The compression spring 13 applies direct force against the fixed lid 4 so that the connection between the fixed magnet 16 and the free magnet 17 is broken. The fixed magnet 16 engages and disengages with the free magnet 17 so that the tubular housing 1 may be closed and opened with the release lid 5. More specifically the free magnet 17 connects and disconnects the release lid 5 with the trigger bar 7 via the fixed magnet 16. In the preferred embodiment of the present invention, the fixed magnet 16 and the free magnet 17 are both compatible magnets that attract to one another. In alternate embodiments of the present invention, the fixed magnet 16 may be a piece of metal that is able to engage with the free magnet 17. Likewise, the free magnet 17 may be a piece of metal that is able to engage with the fixed magnet 16.

Figure 3:
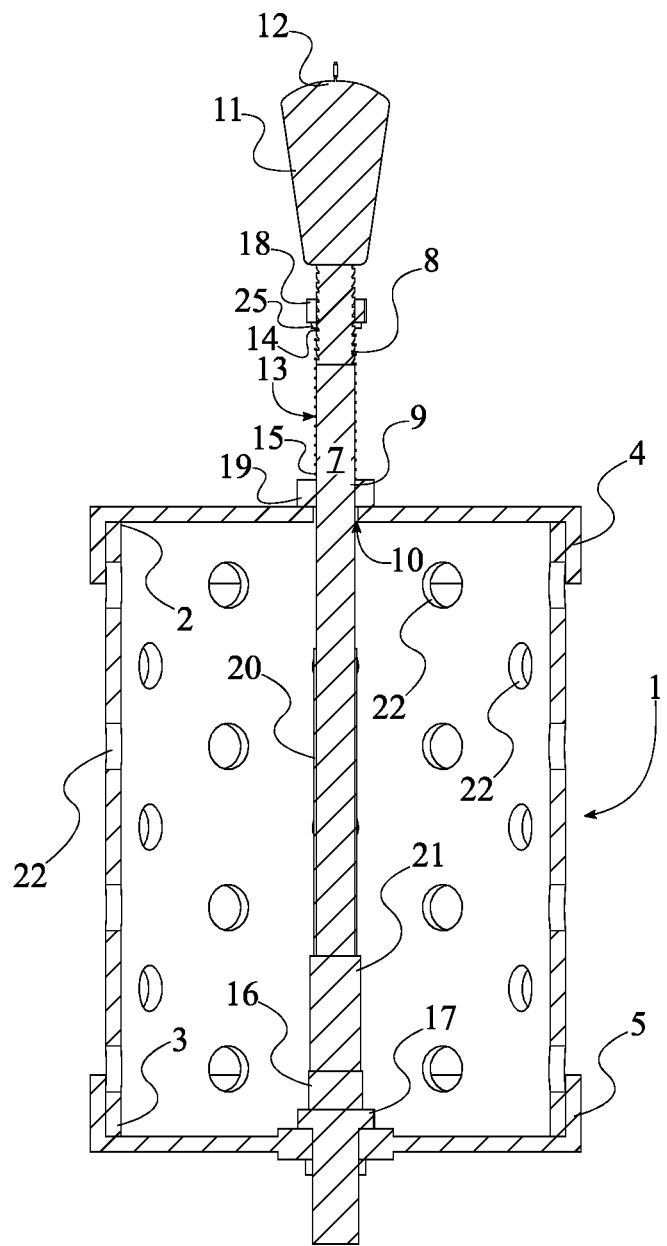
FIG. 3 is a cross-section view of FIG. 2 taken along line 3-3 of the present invention.
Figure 6:
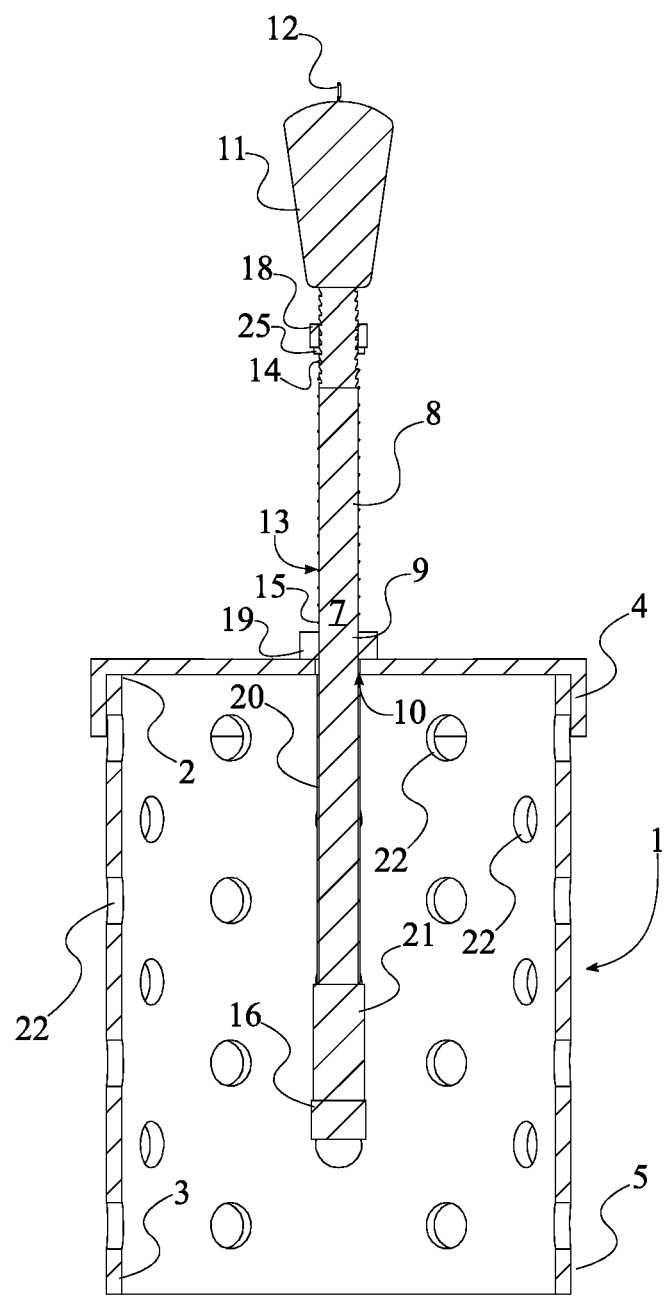
FIG. 6 is a cross-section view of FIG. 5 taken along line 6-6 of the present invention.

The overall arrangement of the aforementioned components allows the present invention to be refilled and reused as well as remotely operated by a user with a fishing pole. In order to effectively house live bait, the first rim 2 is positioned opposite the second rim 3 along the tubular housing 1, seen in FIG. 3. The fixed lid 4 is positioned adjacent with the first rim 2, and the first rim 2 is perimetrically fixed with the fixed lid 4. This arrangement consequently mounts the latching mechanism with the tubular housing 1 and directs the release of live bait in a body of water towards the second rim 3. The release lid 5 is positioned adjacent with the second rim 3 and is tethered with the tubular housing 1. This arrangement seals the tubular housing 1 with the release lid 5 pressed against the second rim 3. Furthermore, the release lid 5 remains connected with the tubular housing 1 upon the release of live bait into the body of water. In order for the latch mechanism 6 to be integrated into the tubular housing 1, the slot 10 traverses through the fixed lid 4, and the trigger bar 7 is slidably engaged through the slot 10, as seen in FIG. 3 and FIG. 6. The trigger bar 7 is easily maneuverable by the grip of the user as the handle 11 is externally positioned with the tubular housing 1 and is terminally fixed with the trigger bar 7. The latch mechanism 6 is therefore directly operable by a user. A fishing line of a fishing pole may be attached with the eyelet 12 as the eyelet 12 is fixed adjacent with the handle 11, opposite the trigger bar 7. This arrangement allows the user to indirectly operate the latch mechanism 6 by pulling the trigger bar 7 with the fishing line that is attached around the eyelet 12. The latch mechanism 6 is integrated into the tubular housing 1 as the fixed magnet 16 is terminally mounted with the trigger bar 7, opposite the handle 11. In order for the fixed magnet 16 and the free magnet 17 to engage with one another, the free magnet 17 is positioned adjacent with the tubular housing 1 and is mounted within the release lid 5. The release lid 5 is therefore engaged and disengaged with the trigger bar 7 with the free magnet 17. In order to reduce the amount of force required to remotely disconnect the fixed magnet 16 from the free magnet 17 with the fishing pole, the compression spring 13 is externally positioned with the tubular housing 1 and is laterally mounted around the trigger bar 7. Wherein the release lid 5 and the tubular housing 1 are in a closed configuration, the fixed magnet 16 is magnetically coupled with the free magnet 17. More specifically, the compression spring 13 is compressed against the fixed lid 4 until the free magnet 17 disengages with the fixed magnet 16.

The present invention further facilitates the attraction of fish with the live bait while contained within the tubular housing 1. The fish are able to detect the live bait as the present invention may further comprise a plurality of holes 22, seen in FIG. 1, FIG. 2, FIG. 3, FIG. 4, FIG. 5, and FIG. 6. The plurality of holes 22 is distributed about the tubular housing 1 and laterally traverses through the tubular housing 1. The plurality of holes 22 not only allows the live bait to be detected by fish nearby, but also preserves the live bait while contained within the tubular housing 1.

In order to facilitate the purposeful disengagement of the fixed magnet 16 with the free magnet 17, the slot 10 is centrally positioned with the fixed lid 4, seen in FIG. 3 and FIG. 6. Moreover, the trigger bar 7 is positioned colinear with the fixed magnet 16, and the free magnet 17 is centrally positioned with the release lid 5. This arrangement allows the release lid 5 to be readily separated with an attached fishing line of a fishing pole regardless of the orientation of the present invention with that of the fishing pole.

The force required to remotely engage the latch mechanism 6 may vary according to the user as the latch mechanism 6 may further comprise a lock nut 18 and a screw nut 25, seen in FIG. 2, FIG. 3, FIG. 5, and FIG. 6. The depending on the current of the body of water, the magnetic coupling between the fixed magnet 16 and the free magnet 17 may need to be stronger and require more force to separate the connection. Likewise, the coupling between the fixed magnet 16 and the free magnet 17 may not need to be as strong in more still water, requiring less force to separate the connection. Together, the lock nut 18 and the screw nut 25 compress and elongate the compression spring 13 along the trigger bar 7. The lock nut 18 serves as a stopper for the screw nut 25, and the screw nut 25 presses against compression spring 13. In order for the lock nut 18 and the stopper nut to have adjustable desired positions along the trigger bar 7, the trigger bar 7 comprises a threaded lengthwise portion 8 and a shank lengthwise portion 9. The threaded lengthwise portion 8 is positioned adjacent with the handle 11, and the shank lengthwise portion 9 is positioned adjacent with the fixed magnet 16. This arrangement allows the lock nut 18 and the screw nut 25 to press against the compression spring 13 outside of the tubular housing 1. More specifically, the adjustment of the length of the compression spring 13 across the trigger bar 7 is accessible with or without live bait housed within the tubular housing 1. The lock nut 18 and the screw nut 25 are threadedly engaged with the threaded lengthwise portion 8, thereby having a secure position along the trigger bar 7. The lock nut 18 is positioned in between the screw nut 25 and the handle 11. This facilitates the adjustment of the screw nut 25 with the compression spring 13 as the lock nut 18 serves as a stopper along trigger bar 7 for the screw nut 25. More specifically, the screw nut 25 is pressed against the lock nut 18, and the compression spring 13 is pressed in between the screw nut 25 and the fixed lid 4. In the preferred embodiment of the present invention, the screw nut 25 is turned counterclockwise along the threaded lengthwise portion 8 in order to increase the strength of the magnetic coupling between the fixed magnet 16 and the free magnet 17. Likewise, the screw nut 25 is turned clockwise along the threaded lengthwise portion 8 in order to decrease the strength of the magnetic coupling between the fixed magnet 16 and the free magnet 17.

The compression spring 13 is secured with the fixed lid 4 as the latch mechanism 6 may further comprise a stopper washer 19, seen in FIG. 1, FIG. 2, FIG. 3, FIG. 4, FIG. 5, and FIG. 6. The stopper washer 19 secures the compression spring 13 with the fixed lid 4, stabilizing compression spring 13 around the trigger bar 7. In order for the compression spring 13 to be stabilized with the fixed stopper washer 19, the compression spring 13 comprises a fixed end 14 and a free end 15. The fixed end 14 is positioned opposite the free end 15 about the compression spring 13. The stopper washer 19 is mounted onto the fixed lid 4 and is positioned concentric with the slot 10, allowing the trigger bar 7 to continuously traverse through the fixed lid 4. Moreover, the stopper washer 19 is externally positioned with the tubular housing 1, and the trigger bar 7 is slidably engaged through the stopper washer 19. The fixed end 14 is positioned adjacent with the stopper washer 19 and is mounted onto the fixed lid 4 by the stopper washer 19 so that the compression spring 13 does not misalign when the fixed magnet 16 and the free magnet 17 are disengaged. The free end 15 is positioned adjacent with the handle 11 so that the screw nut 25 may adjust the overall length of the compression spring 13 along the trigger bar 7.

As seen in FIG. 3 and FIG. 6, the latch mechanism 6 may also further comprise a spacer tube 20 that prevents the trigger bar 7 from fully retracting and hitting against the fixed lid 4 as the fixed magnet 16 disengages from the free magnet 17. The trigger bar 7 is positioned through the spacer tube 20 so that the trigger bar 7 may freely slide into and out of the slot 10 while remaining engaged with the spacer tube 20. The spacer tube 20 is positioned in between the fixed magnet 16 and the fixed lid 4 thereby offsetting the fixed magnet 16 with the fixed lid 4. More specifically, in order to allow the trigger bar 7 to retract, a length of the spacer tube 20 is less than a distance between the fixed lid 4 and the fixed magnet 16.

Figure 4:
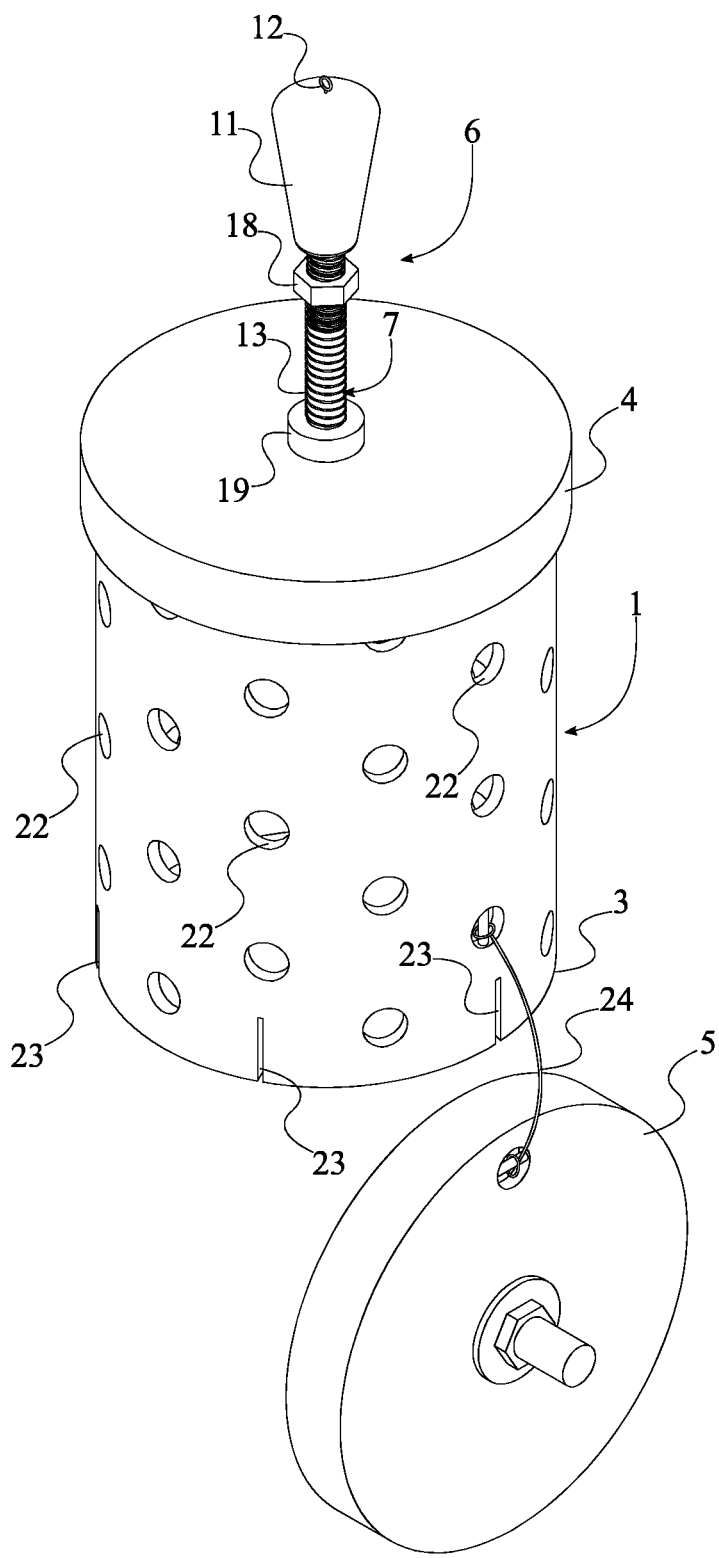
FIG. 4 is a perspective view of the present invention in an opened configuration.
Figure 5:
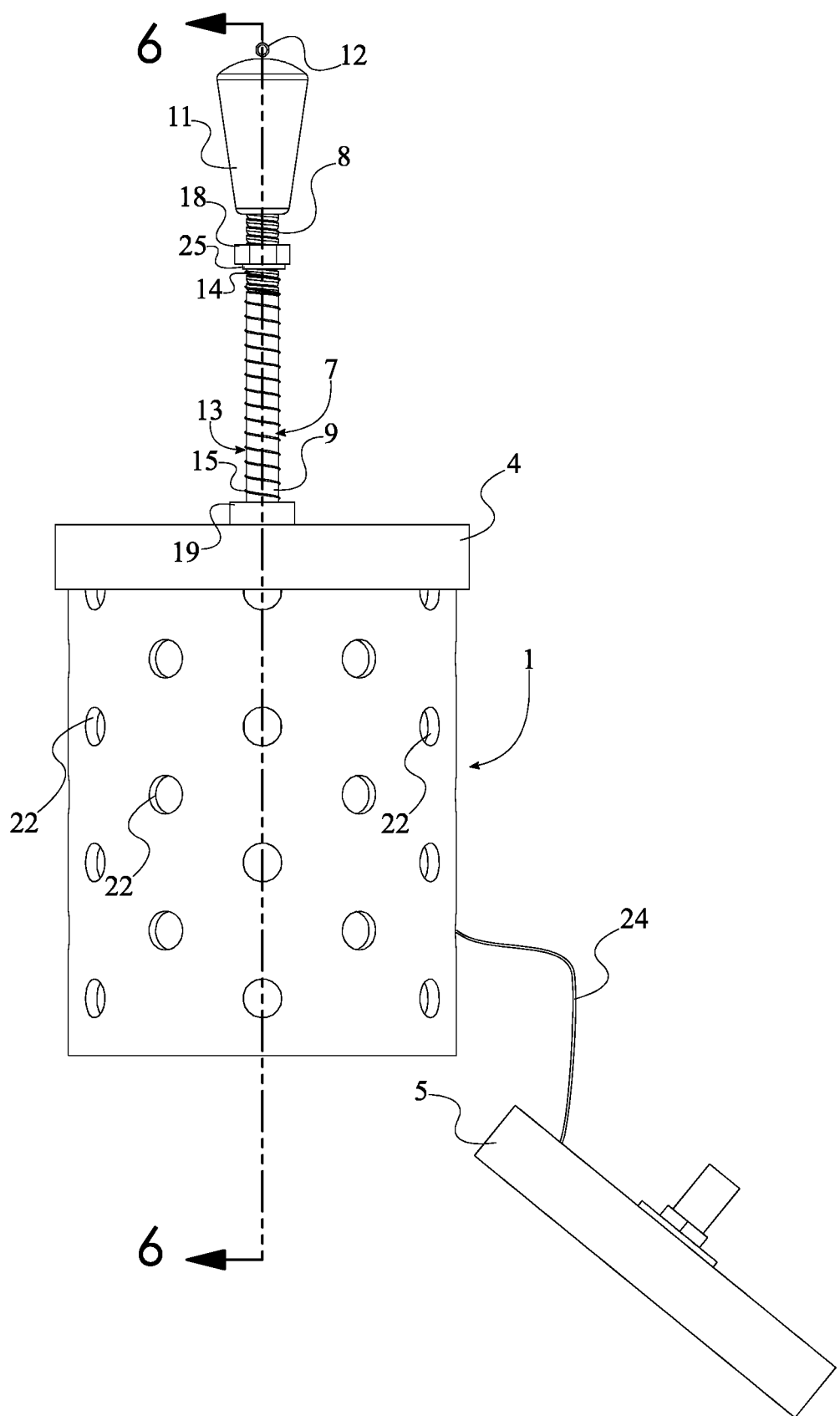
FIG. 5 is a front side view of the present invention thereof.

The present invention provides additional mounts for bait lines as the present invention may further comprise a plurality of bait-line slots 23, seen in FIG. 4. The plurality of bait-line slots 23 is positioned adjacent with the second rim 3 and distributed around the second rim 3 so that each bait line may be inserted into a respective bait-line slot of the plurality of bait-line slots 23. Each of the plurality of bait-line slots 23 laterally traverse through the tubular housing 1 so that each bait line may be connected with the tubular housing 1.

In the preferred embodiment of the present invention, the latch mechanism 6 may further comprise an adapter 21, seen in FIG. 3 and FIG. 6. The adapter 21 securely mounts the fixed magnet 16 with the trigger bar 7. The fixed magnet 16 is terminally connected to the trigger bar 7 by the adapter 21. The preferred embodiment of the present invention further comprises a piece of fishing line 24. The piece of fishing line 24 allows the release lid 5 to freely separate from the tubular housing 1 while remaining connected with the tubular housing 1 in the body of water. More specifically, the release lid 5 is tethered with the tubular housing 1 by the piece of fishing line 24.

In order to fill or refill the present invention with live bait, the tubular housing 1 preferably oriented upside down with the release lid 5 positioned above the fixed lid 4. The trigger bar 7 is pulled away, preferably with the handle 11, from the fixed lid 4 so that the fixed magnet 16 and the free magnet 17 disengage with one another. The user may freely lift the release lid 5 from the second rim 3 of the tubular housing 1 and insert live bait into the tubular housing 1 through the second rim 3. The user positions the release lid 5 over the second rim 3 once the tubular housing 1 is filled. The user presses the release lid 5 against the tubular housing 1 while simultaneously pushing the trigger bar 7 towards the fixed lid 4 with the handle 11 until the fixed magnet 16 magnetically couples with the free magnet 17. The user may position the present invention into a body of water.

Although the invention has been explained in relation to its preferred embodiment, it is to be understood that many other possible modifications and variations can be made without departing from the spirit and scope of the invention as hereinafter claimed.

What is claimed is:

1. A magnetic bait-release device comprises:
    a tubular housing;
    a fixed lid;
    a release lid;
    a latch mechanism;
    the tubular housing comprises a first rim and a second rim;
    the latch mechanism comprises a trigger bar, a slot, a handle, an eyelet, a compression spring, a fixed magnet, and a free magnet;
    the first rim being positioned opposite the second rim along the tubular housing;
    the fixed lid being positioned adjacent with the first rim;
    the first rim being perimetrically fixed with the fixed lid;
    the release lid being positioned adjacent with the second rim;
    the release lid being tethered with the tubular housing;
    the slot traversing through the fixed lid;
    the trigger bar being slidably engaged through the slot;
    the handle being externally positioned with the tubular housing;
    the handle being terminally fixed with the trigger bar;
    the eyelet being fixed adjacent with the handle, opposite the trigger bar;
    the fixed magnet being terminally mounted with the trigger bar, opposite the handle;
    the free magnet being positioned adjacent the tubular housing;
    the free magnet being mounted within the release lid;
    the compression spring being externally positioned with the tubular housing; and,
    the compression spring being laterally mounted around the trigger bar.

2. The magnetic bait-release device as claimed in claim 1 comprises:
    wherein the release lid and the tubular housing are in a closed configuration; and,
    the fixed magnet being magnetically coupled with the free magnet.

3. The magnetic bait-release device as claimed in claim 1 comprises:
    a plurality of holes;
    the plurality of holes being distributed about the tubular housing; and,
    the plurality of holes laterally traversing through the tubular housing.

4. The magnetic bait-release device as claimed in claim 1 comprises:
    the slot being centrally positioned with the fixed lid;
    the trigger bar being positioned colinear with the fixed magnet; and,
    the free magnet being centrally positioned with the release lid.

5. The magnetic bait-release device as claimed in claim 1 comprises:
    the latch mechanism further comprises a lock nut and a screw nut;
    the trigger bar comprises a threaded lengthwise portion and a shank lengthwise portion;
    the threaded lengthwise portion being positioned adjacent with the handle;
    the shank lengthwise portion being positioned adjacent with the fixed magnet;
    the lock nut and the screw nut being threadedly engaged with the threaded lengthwise portion;
    the lock nut being positioned in between the screw nut and the handle;
    the screw nut being pressed against the lock nut; and,
    the compression spring being pressed in between the screw nut and the fixed lid.

6. The magnetic bait-release device as claimed in claim 1 comprises:
    the latch mechanism further comprises a stopper washer;
    the compression spring comprises a fixed end and a free end;
    the fixed end being positioned opposite the free end about the compression spring;
    the stopper washer being mounted onto the fixed lid;
    the stopper washer being positioned concentric with the slot;
    the stopper washer being externally positioned with the tubular housing;
    the trigger bar being slidably engaged through the stopper washer;
    the fixed end being positioned adjacent the stopper washer;
    the fixed end being mounted onto the fixed lid by the stopper washer; and,
    the free end being positioned adjacent with the handle.

7. The magnetic bait-release device as claimed in claim 1 comprises:
    the latch mechanism further comprises a spacer tube;
    the trigger bar being positioned through the spacer tube;
    the spacer tube being positioned between the fixed magnet and the fixed lid; and,
    a length of the spacer tube being less than a distance between the fixed lid and the fixed magnet.

8. The magnetic bait-release device as claimed in claim 1 comprises:
    a plurality of bait-line slots;
    the plurality of bait-line slots being positioned adjacent with the second rim;
    the plurality of bait-line slots being distributed around the second rim; and,
    each of the plurality of bait-line slots laterally traversing through the tubular housing.

9. The magnetic bait-release device as claimed in claim 1 comprises:
    the latch mechanism further comprises an adapter; and,
    the fixed magnet being terminally connected to the trigger bar by the adapter.

10. The magnetic bait-release device as claimed in claim 1 comprises:

a piece of fishing line; and,
the release lid being tethered with the tubular housing by the piece of fishing line.

11. A magnetic bait-release device comprises:
a tubular housing;
a fixed lid;
a release lid;
a latch mechanism;
a plurality of holes;
the tubular housing comprises a first rim and a second rim;
the latch mechanism comprises a trigger bar, a slot, a handle, an eyelet, a compression spring, a fixed magnet, a free magnet, and a spacer tube;
the first rim being positioned opposite the second rim along the tubular housing;
the fixed lid being positioned adjacent with the first rim;
the first rim being perimetrically fixed with the fixed lid;
the release lid being positioned adjacent with the second rim;
the release lid being tethered with the tubular housing;
the slot traversing through the fixed lid;
the trigger bar being slidably engaged through the slot;
the handle being externally positioned with the tubular housing;
the handle being terminally fixed with the trigger bar;
the eyelet being fixed adjacent with the handle, opposite the trigger bar;
the fixed magnet being terminally mounted with the trigger bar, opposite the handle;
the free magnet being positioned adjacent the tubular housing;
the free magnet being mounted within the release lid;
the compression spring being externally positioned with the tubular housing;
the compression spring being laterally mounted around the trigger bar;
the plurality of holes being distributed about the tubular housing;
the plurality of holes laterally traversing through the tubular housing;
the trigger bar being positioned through the spacer tube;
the spacer tube being positioned between the fixed magnet and the fixed lid; and,
a length of the spacer tube being less than a distance between the fixed lid and the fixed magnet.

12. The magnetic bait-release device as claimed in claim 11 comprises:
wherein the release lid and the tubular housing are in a closed configuration; and,
the fixed magnet being magnetically coupled with the free magnet.

13. The magnetic bait-release device as claimed in claim 11 comprises:
the slot being centrally positioned with the fixed lid;
the trigger bar being positioned colinear with the fixed magnet; and,
the free magnet being centrally positioned with the release lid.

14. The magnetic bait-release device as claimed in claim 11 comprises:
the latch mechanism further comprises a lock nut and a screw nut;
the trigger bar comprises a threaded lengthwise portion and a shank lengthwise portion;
the threaded lengthwise portion being positioned adjacent with the handle;
the shank lengthwise portion being positioned adjacent with the fixed magnet;
the lock nut and the screw nut being threadedly engaged with the threaded lengthwise portion;
the lock nut being positioned in between the screw nut and the handle;
the screw nut being pressed against the lock nut; and,
the compression spring being pressed in between the screw nut and the fixed lid.

15. The magnetic bait-release device as claimed in claim 11 comprises:
the latch mechanism further comprises a stopper washer;
the compression spring comprises a fixed end and a free end;
the fixed end being positioned opposite the free end about the compression spring;
the stopper washer being mounted onto the fixed lid;
the stopper washer being positioned concentric with the slot;
the stopper washer being externally positioned with the tubular housing;
the trigger bar being slidably engaged through the stopper washer;
the fixed end being positioned adjacent the stopper washer;
the fixed end being mounted onto the fixed lid by the stopper washer; and,
the free end being positioned adjacent with the handle.

16. The magnetic bait-release device as claimed in claim 11 comprises:
a plurality of bait-line slots;
the plurality of bait-line slots being positioned adjacent with the second rim;
the plurality of bait-line slots being distributed around the second rim; and,
each of the plurality of bait-line slots laterally traversing through the tubular housing.

17. The magnetic bait-release device as claimed in claim 11 comprises:
the latch mechanism further comprises an adapter; and,
the fixed magnet being terminally connected to the trigger bar by the adapter.

18. The magnetic bait-release device as claimed in claim 11 comprises:
a piece of fishing line; and,
the release lid being tethered with the tubular housing by the piece of fishing line.

\* \* \* \* \*